UNITED STATES PATENT OFFICE.

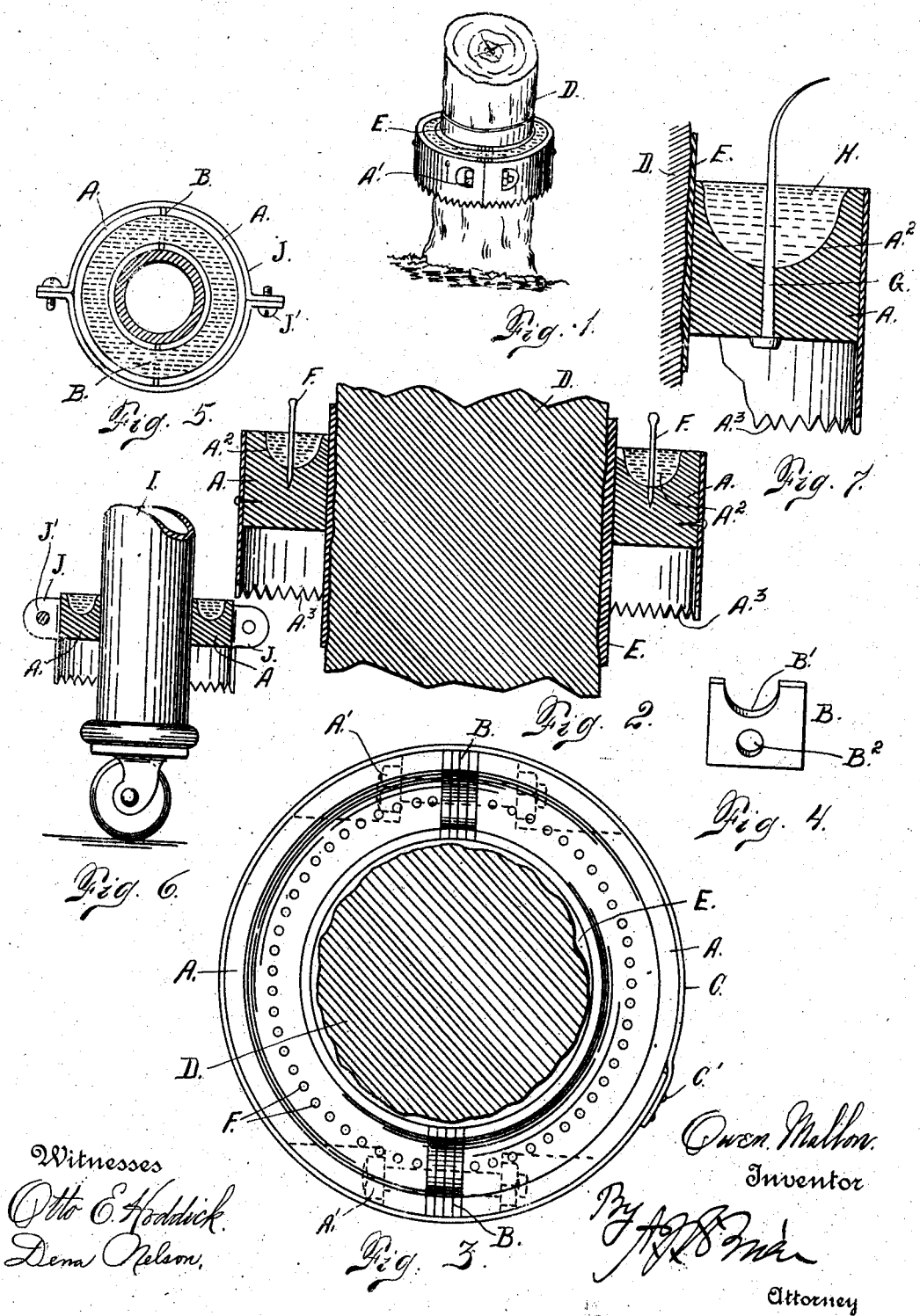

OWEN MALLON, OF LAFAYETTE, COLORADO.

INSECT-TRAP.

No. 839,167.

Specification of Letters Patent.

Patented Dec. 25, 1906.

Application filed April 16, 1904. Renewed June 12, 1906. Serial No. 321,386.

*To all whom it may concern:*

Be it known that I, OWEN MALLON, a citizen of the United States of America, residing at Lafayette, in the county of Boulder and State of Colorado, have invented certain new and useful Improvements in Insect-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in insect-traps; and its object is to prevent insects from climbing trees, legs of beds, and other objects.

The apparatus, broadly stated, consists of a device adapted to be applied to the tree, the leg of the bed, or other article, and whose upper surface is recessed to contain a quantity of poisonous liquid through which the insect must pass in order to climb above the device. The lower part of the device may also be provided with saw-teeth, having a tendency to deter the crawling insect from passing upwardly above the device. The device may also be provided with pointed projections extending upwardly through the liquid-containing receptacle or recess, whereby there is a tendency to further prevent insects or vermin from crossing the liquid. These pointed projections are specially intended to prevent insects from jumping across the liquid-containing receptacle. Ordinary crawling insects will be obliged to enter the poisonous liquid and will therefore be unable to pass above my improved device.

Having briefly outlined the invention, as well as the function it is intended to perform, I will proceed to describe the same in detail, reference being made to the accompanying drawings, in which is illustrated an embodiment thereof.

In the drawings, Figure 1 shows my improved device applied to the body of a tree. Fig. 2 is a section taken through the device and the tree-body to which it is applied. Fig. 3 is a horizontal section taken through the body of the tree above the device looking downwardly. Fig. 4 is a perspective view of a rubber washer such as are interposed between the two twin parts of the device. Fig. 5 is a cross-section taken through the leg of a bed or other article of furniture looking down upon the device, which is of slightly different construction from that shown in the previous views. Fig. 6 shows the device applied to the leg of a bed or other article of furniture, the device being shown in section and the furniture-leg in elevation and broken away above the device. Fig. 7 is an enlarged sectional view taken through one side of the device and illustrating a peculiar form of upwardly-projecting part to prevent jumping insects from crossing the moat or recess in which the poisonous liquid is placed.

The same reference characters indicate the same parts in all the views.

Referring first to Figs. 1, 2, 3, 4, and 7 of the drawings, let A designate each of two semicircular pieces whose extremities engage rubber washers B, whereby the extremities of the two semicircular members of the device may be made to form a liquid-tight joint. These two parts A are secured together at their extremities by bolts $A'$ or other suitable fastening devices. The two members A are provided with a liquid-containing recess $A^2$, and the washers B are recessed, as shown at $B'$, to allow the liquid to circulate entirely around the object to which the device is applied, whereby a continuous liquid-containing receptacle is formed. The two parts A may be formed of wood or other suitable cheap material. After these two parts are secured to the object a metal band C may be passed around them and secured by means of small nails $C'$, the two extremities of the part C overlapping each other for the purpose. Where the device is applied to the body D of a tree, as shown in Figs. 1, 2, and 3, some suitable packing material E may be wound around the body of the tree in order to overcome the unevenness of its surface, whereby when the device is applied there will be no opportunity for insects to pass between the body of the tree and the parts A of the device. The metal part $A^2$ may preferably consist of tin or other thin sheet metal. It extends below the parts A, and its lower edge is toothed, as shown at $A^3$, and is located a considerable distance from the body of the tree, thus making it difficult for insects even to pass the toothed edge $A^3$, which skirts the device. In the form of construction shown in Fig. 1 the bolts $A'$ are inserted after the metal part C is applied to the members A. In this event openings are necessarily cut in the metal part in order to enable the members A to be cut away to form shoulders or seats for the head of the bolt and the fastening-nut applied thereto. In Fig. 3 four rubber washers B are indicated. These washers are provided with openings B², through which the fastening-bolts are passed. It is evident that by tightening these bolts the water-tight joint may be formed at the extremities of the members A. In the form of construction shown in Fig. 2 a sort of fence is formed of nails F, which are driven into the parts A in the center of the liquid-containing recess and project above the liquid therein. This nail fence has a tendency to prevent vermin from crossing the liquid-containing recess or moat. In the form shown in Fig. 7 sharp-pointed nails G are driven upwardly through the parts A in the center of the liquid-containing recess and project above the same, their upper sharpened extremities being bent outwardly to prevent jumping vermin from crossing the liquid H.

In the form of construction shown in Figs. 5 and 6 the two members A are locked in place on the leg I of an article of furniture by means of two metal parts J, having abutting flanges connected by screws J'. In Fig. 5 a single rubber washer B is employed between the abutting extremities of the members A on each side.

From the foregoing description the use and operation of my improved device will be readily understood. After the device is applied, the circular recess or moat is preferably filled with a poisonous liquid adapted to kill the insects or vermin which enter it. In some instances water may be a sufficient protection; but it is preferred to use a poisonous solution in order to absolutely prevent troublesome vermin from passing above the device.

Having thus described my invention, what I claim is—

1. An insect-trap consisting of a device composed of a plurality of parts adapted to be secured to a cylindrical object, the said parts having a liquid-containing recess formed in their upper surface, and means interposed between the adjacent extremities of the sections of the device for forming a liquid-tight joint, the said means being recessed to register with the recess of the said sections, and suitable means surrounding the said sections for holding them together and securing them in place, comprising a sheet-metal band attached to the sections by fastening devices and extending below the said sections, its lower edge being toothed or notched.

2. An insect-trap comprising a circular device adapted to surround a cylindrical object, the said device being made to fit the object closely and having its upper surface recessed to contain liquid, and nails or brads inserted in the recessed portion of the device and projecting upwardly above the liquid therein.

In testimony whereof I affix my signature in presence of two witnesses.

OWEN MALLON.

Witnesses:
A. J. O'BRIEN,
DENA NELSON.